Figure 1:
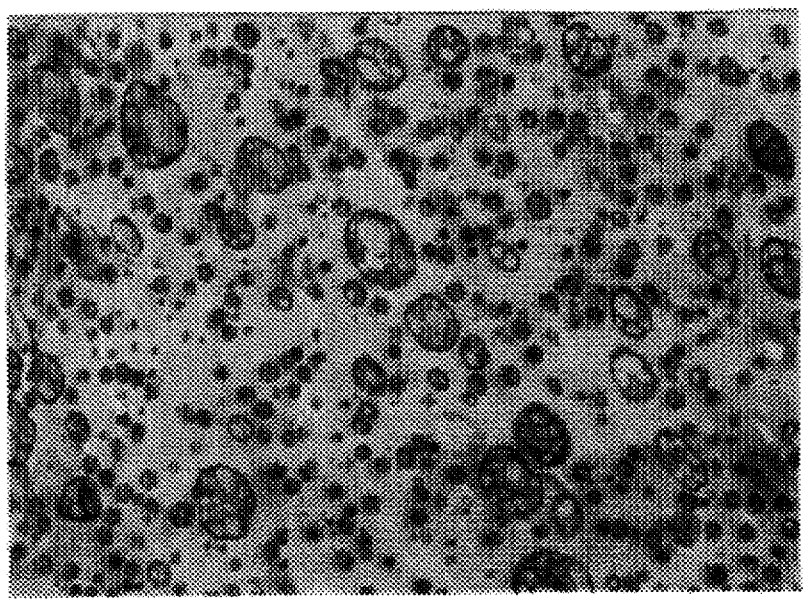

United States Patent

Eichenauer et al.

[11] Patent Number: 5,696,204
[45] Date of Patent: *Dec. 9, 1997

[54] THERMOPLASTIC MOULDING COMPOSITIONS OF THE ABS TYPE

[75] Inventors: Herbert Eichenauer; Edgar Leitz, both of Dormagen; Karl-Erwin Piejko, Bergisch Gladbach; Heinrich Alberts, Odenthal, all of Germany

[73] Assignee: Bayer AG, Leverkusen, Germany

[*] Notice: The term of this patent shall not extend beyond the expiration date of Pat. No. 5,674,939.

[21] Appl. No.: 609,163

[22] Filed: Feb. 26, 1996

[30] Foreign Application Priority Data

Mar. 6, 1995 [DE] Germany ............... 195 07 749.0

[51] Int. Cl.⁶ ............... C08L 55/02; C08L 51/04; C08F 279/00
[52] U.S. Cl. ............... 525/64; 525/66; 525/67; 525/71; 525/316
[58] Field of Search ............... 525/64, 66, 67, 525/71, 316

[56] References Cited

U.S. PATENT DOCUMENTS 4,430,478  2/1984  Schmitt et al. ............... 525/71
4,713,420  12/1987  Henton ............... 525/71
4,868,235  9/1989  Muehlbach ............... 525/67

FOREIGN PATENT DOCUMENTS 505 799  9/1992  European Pat. Off.

*Primary Examiner*—David Buttner
*Attorney, Agent, or Firm*—Connolly and Hutz

[57] ABSTRACT

Thermoplastic moulding compositions comprising

A) 1 to 60 parts by weight of at least one particulate graft rubber polymer of the ABS type which is produced by emulsion polymerisation, in which at least 50% of the graft rubber particles (number) have a structure detectable via transmission electron microscopy photographs in which the individual particles contain irregular cellular inclusions of resin-forming polymer and the surface of the particles has an irregular jagged structure such that 5 to 30 of such peaks are present per depicted particle, which particles differ from an idealised round particle (having a diameter d) by a diameter d+d/x, where x=3 to 15, B) 40 to 99 parts by weight of at least one particulate graft rubber polymer of the ABS type which is produced by solution or bulk polymerisation and which has the morphology which is characteristic of bulk types of ABS, and optionally C) 0 to 200 parts by weight of at least one thermoplastic, rubber-free resin.

4 Claims, 2 Drawing Sheets

10 000 : 1
⊢—⊣ 1 μm
1 cm 23 000 : 1
⊢— 200 nm
0,46 cm

THERMOPLASTIC MOULDING COMPOSITIONS OF THE ABS TYPE

ABS moulding compositions have already been used in large amounts for many years as thermoplastic resins for the production of mouldings of all types. In this connection, the property spectrum of these resins ranges from relatively brittle to extremely tough.

One special area of use for ABS moulding compositions is the production of mouldings having exacting requirements as regards toughness under the effect of impact, particularly at low temperatures also, as well as the possibility of deliberate adjustment (gradations between glossy and matt) of their surface gloss (e.g. in the automobile sector or for the production of housing parts).

ABS products having a high toughness and a relatively high surface gloss can be produced using conventional emulsion ABS with the use of large amounts of rubber. However, this is associated with disadvantages as regards other properties, e.g. the modulus of elasticity, dimensional stability under the effect of heat, and thermoplastic flowability.

ABS products having a relatively low surface gloss can be obtained, for example, by polymerisation by the solution or bulk polymerisation process. Products with a high low-temperature toughness are not obtained by these processes, however.

In fact, selective improvements can be obtained by mixing conventional emulsion types of ABS with solution or bulk types of ABS (see U.S. Pat. No. 4,430,478, for example). However, the exacting requirements as regards toughness and flowability with simultaneous retention of the low surface gloss which is characteristic of bulk ABS are not fulfilled by these materials.

It has been found that products having the combination of properties described above are obtained by a combination of ABS polymers, which are produced via emulsion polymerisation and which have a special jagged structure, with ABS polymers produced via solution or bulk polymerisation.

The present invention relates to thermoplastic moulding compositions containing

A) 1 to 60 parts by weight, preferably 2 to 50 parts by weight, and most preferably 5 to 40 parts by weight, of at least one particulate graft rubber polymer of the ABS type which is produced by emulsion polymerisation, in which at least 50% of the graft rubber particles (number), preferably at least 60% of the graft rubber particles (number) and most preferably at least 70% of the graft rubber particles (number) have a structure detectable via transmission electron microscopy photographs in which the individual particles contain irregular cellular inclusions of resin-forming polymer and the surface of the particles has an irregular jagged structure such that 5 to 30, preferably 7 to 25, and most preferably 10 to 20 of such peaks are present per depicted particle, which particles differ from an idealised round particle (having a diameter d) by a diameter d+d/x, where x=3 to 15, preferably 4 to 12, and most preferably 5 to 10, B) 40 to 99 parts by weight, preferably 50 to 98 parts by weight, and most preferably 60 to 95 parts by weight, of at least one particulate graft rubber polymer of the ABS type which is produced by solution or bulk polymerisation and which has the morphology which is characteristic of bulk types of ABS, and optionally C) 0 to 200 parts by weight, preferably 0 to 100 parts by weight, of at least one thermoplastic, rubber-free resin.

Graft rubber A) is produced by the emulsion polymerisation of resin-forming monomers in the presence of rubber which exists in the form of latex.

For this purpose, preferably 40 to 90 parts by weight, more preferably 45 to 85 parts by weight, and most preferably 50 to 80 parts by weight of a resin-forming monomer (preferably a mixture of styrene and acrylonitrile, which may optionally contain up to 50% by weight (with respect to the total amount of monomer used in the graft polymerisation) of one or more comonomers) are polymerised in the presence of 10 to 60 parts by weight, preferably 15 to 55 parts by weight, and most preferably 20 to 50 parts by weight (calculated as the solid in each case) of a rubber latex (preferably polybutadiene latex) having a swelling index $\geq 30$, preferably $\geq 40$, and most preferably $\geq 50$ (in toluene) in such a way that during 25 to 90%, preferably 30 to 80%, and most preferably 35 to 75%, of the total reaction time, an amount of 5 to 70% by weight, preferably 7.5 to 60% by weight, and most preferably 10 to 50% by weight (with respect to the total monomer used up to the respective point in time) of unreacted monomer is present in the reaction mixture.

The rubbers used for the production of graft rubber polymer A) are preferably those having a glass transition temperature below 0° C.

The following are suitable, for example:

diene rubbers, namely homopolymers of conjugated dienes having 4 to 8 C atoms such as butadiene, isoprene, chloroprene or copolymers thereof containing up to 60% by weight, preferably 1 to 30% by weight, of a vinyl monomer, e.g. acrylonitrile, methacrylonitrile, styrene, α-methylstyrene, halogenostyrenes, $C_1$–$C_4$-alkyl styrenes, $C_1$–$C_6$-alkyl acrylates and methacrylates, alkylene glycol diacrylates and methacrylates, and divinylbenzene;

acrylate rubbers, namely homo- and copolymers of $C_1$–$C_{10}$-alkyl acrylates, e.g. homopolymers of ethyl acrylate, butyl acrylate or 2-ethylhexyl acrylate, or copolymers containing up to 40% by weight, preferably not more than 10% by weight, of monovinyl monomers, e.g. styrene, acrylonitrile, vinyl butyl ether, acrylic acid (ester), methacrylic acid (ester), or vinyl sulphonic acid. Acrylate rubber homo- or copolymers such as these are preferably used which contain 0.01 to 8% by weight of divinyl or polyvinyl compounds and/or N-methylolacrylamide (or N-methacrylamide) derivatives which act as crosslinking agents, e.g. divinylbenzene or triallyl cyanurate, and wherein the rubber contains C═C double bonds;

terpolymer rubbers, namely copolymers of mono-olefinic hydrocarbons, e.g. ethylene or propylene, and dienes, e.g. butadiene or cyclopentadiene.

Polybutadiene rubbers and SBR rubbers containing up to 30% by weight of styrene which is polymerised in are preferred. Polybutadiene is particularly preferred.

The rubber polymers to be used for the production of graft rubber polymer A) have swelling indices (in toluene) $\geq 30$, preferably $\geq 40$ and most preferably $\geq 50$. In this respect, the swelling index is determined as follows:

1 g of dry, stabilised rubber cut into small pieces is mixed with 100 cm³ of toluene and shaken for 24 hours in a brown bottle. Suction is then effected through a double cloth filter until the filtrate no longer contains any sediment. After washing with further toluene, the sediment is weighed in its moist state. Thereafter it is dried to constant weight at 70° C. in a drying oven and re-weighed. The swelling index (QI) is given by the relationship $$QI = \frac{\text{sediment (moist)}}{\text{sediment (dry)}}.$$

The production of rubbers having swelling indices such as these is known in principle. The requisite values are obtained by the use of suitable reaction conditions (e.g. low reaction temperature or the addition of molecular weight regulators such as mercaptans, for example).

The size of the rubber particles to be used for the production of graft rubber polymer A) may be varied within wide limits, e.g. average diameters from about 50 nm to about 500 nm are possible in principle. Rubbers having average diameters from about 200 nm to about 400 nm, most preferably from about 250 nm to about 350 nm, are preferred. In this respect the average diameters denote $d_{50}$ values which are determined by ultracentrifuge measurements (see W. Scholtan and H. Lange in Kolloid-Z. and Z. Polymere 250, pages 782–796 (1972)).

The resin-forming monomers used in the production of the graft rubber are preferably vinyl compounds containing a vinyl group, e.g. styrene, $C_1$–$C_4$-alkyl-substituted styrenes, α-methylstyrene, acrylonitrile, methacrylonitrile, esters of acrylic acid and/or of methacrylic acid with $C_1$–$C_8$ aliphatic or cycloaliphatic alcohols, N-substituted maleic imide, or mixtures thereof. Mixtures of styrene and acrylonitrile, preferably in a weight ratio of 60:40 to 80:20, are particularly preferred, wherein styrene and/or acrylonitrile may be partially replaced by copolymerisable monomers, preferably by α-methylstyrene, methyl methacrylate or N-phenylmaleic imide.

In addition, molecular weight regulators may be used in the graft polymerisation, preferably in amounts of 0.05 to 2% by weight, most preferably in amounts of 0.1 to 1% by weight (with respect to the total amount of monomer in the graft polymerisation reaction in each case).

Examples of suitable molecular weight regulators include n-dodecyl mercaptan, t-dodecyl mercaptan and dimeric α-methylstyrene.

Practically all substances which function as radical formers can be used as initiators. Examples of these include inorganic and organic peroxides, e.g. $H_2O_2$, di-tert.-butyl peroxide, cumene hydroperoxide, dicyclohexyl percarbonate, tert.-butyl hydroperoxide, p-menthane hydroperoxide, azo initiators, such as azobis-isobutyronitrile for example, inorganic persalts such as ammonium, sodium or potassium persulphate, potassium perphosphate or sodium perborate, and redox systems which are composed of a reducing agent and of what is as a rule an organic oxidising agent, wherein heavy metal ions are preferably present in addition in the reaction mixture (see H. Logemann in Houben-Weyl, Methoden der organischen Chemie [*Methods of Organic Chemistry*], Volume 14/1, pages 263 to 297).

The preferred initiators are ammonium, sodium and potassium persulphates. Potassium persulphate is particularly preferred.

The reaction temperature during the production of the graft rubber is 30° to 150° C., preferably 40° to 90° C.

The emulsifiers used may be the usual anionic emulsifiers such as alkyl sulphates, alkyl sulphonates, aralkyl sulphonates, soaps of alkali-disproportionated or hydrogenated abietic or tall oil acids, soaps of saturated or unsaturated fatty acids, or emulsifiers based on compounds having cyclic hydrocarbon skeletons according to DE-OS 3 919 548 and DE-OS 3 925 634. Emulsifiers containing carboxyl groups (e.g. salts of $C_{10}$–$C_{18}$ fatty acids, salts of disproportionated abietic acid) are preferably used.

The structure of the graft rubber particles can be detected by transmission electron microscopy methods (e.g. by contrasting with osmium tetroxide; see J. A. Manson, I. H. Sperling: Polymer Blends and Composites (Plenum Press, New York/London, 1976), pages 57–58, and the literature references cited therein, for example). In this respect, the graft rubber particles in the electron microscopy photographs must contain irregular cellular inclusions of the resin-forming polymer and must exhibit an irregular jagged structure on the particle surface. 5 to 30, preferably 7 to 25, and most preferably 10 to 20 peaks must be present per particle, which particles differ from an idealised round particle (having a diameter d) by a diameter d+d/x, where x=3 to 15, preferably 4 to 12, and most preferably 5 to 10. Schematically:

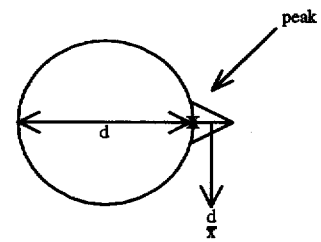

Practically all ABS polymers having the morphology which is characteristic of bulk types of ABS are suitable as the particulate graft rubber polymers of the ABS type which are produced by bulk or solution polymerisation (component B).

In general, this morphology can be described as a cellular morphology. In principle, however, all other morphologies which can be obtained during bulk or solution polymerisation by varying the reaction conditions could be used (e.g. particles with a ball, capsule, shell, filamentary or labyrinth structure)

The bulk ABS polymers which are suitable according to the invention as component B) generally have rubber contents of 4 to 35% by weight, preferably 5 to 30% by weight, and most preferably 6 to 25% by weight.

The size of the rubber phase may be varied within wide limits depending on the reaction conditions during the production process, e.g. average particle diameters of the rubber phase from about 100 nm to more than 10,000 nm are possible in principle (determined by the measurement of electron microscopy photographs).

Bulk ABS polymers are preferably used which have average particle diameters of the rubber phase from 200 nm to 5000 nm, most preferably 400 nm to 2000 nm.

As a rule, a soluble uncrosslinked rubber (preferably synthesised from butadiene or from butadiene/styrene mixtures, e.g. in the form of a block copolymer or a star polymer) is used as the rubber component in the production of graft rubber polymer B) which is obtainable via bulk or solution polymerisation. The monomers described above for the production of graft rubber polymer A), preferably styrene/acrylonitrile mixtures, can be used in principle.

The production of polymers such as these is known, and is described in EP 67 536, EP 103 657, EP 412 801, EP 505 798, DE-OS 26 59 175, U.S. Pat. Nos. 4,252,911, 4,362,850, 5,286,792 or in the literature references cited in these specifications, for example.

Examples of thermoplastic rubber-free resin components C) which may optionally be used in addition comprise:

styrene/acrylonitrile copolymers, α-methylstyrene/ acrylonitrile copolymers, styrene/α-methylstyrene/ acrylonitrile terpolymers, styrene/methyl methacrylate copolymers, methyl methacrylate/acrylonitrile copolymers, polymethyl methacrylate, and styrene/ acrylonitrile/N-phenyl maleic imide terpolymers. Details of the production of these resins are described in DE-AS 2 420 358 and DE-AS 2 724 360, for example. Vinyl resins produced by bulk or solution polymerisation have proved particularly suitable.

Apart from thermoplastic resins of this type, which are synthesised from vinyl monomers, it is possible to use aromatic polycarbonates, aromatic polyester carbonates, polyesters or polyamides as resin component C), for example.

Suitable thermoplastic polycarbonates or polyester carbonates are known (see DE-AS 1 495 626, DE-OS 2 232 877, DE-OS 2 703 376, DE-OS 2 714 544, DE-OS 3 000 610, DE-OS 3 832 396 and DE-OS 3 077 934, for example), and can be produced, for example, by the reaction of diphenols of formulae (I) and (II)

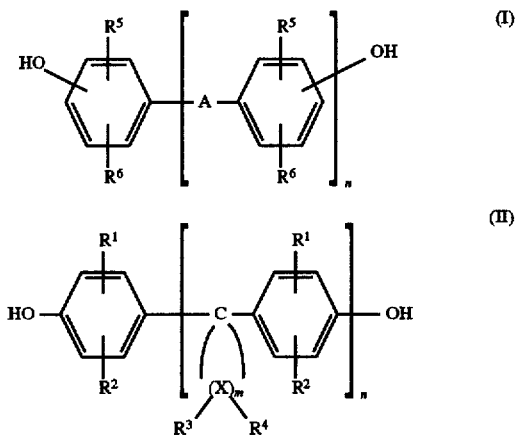

where

A is a single bond, a $C_1$–$C_5$-alkylene, a $C_2$–$C_5$-alkylidene, a $C_5$–$C_6$-cycloalkylidene, —O—, —S—, —SO—, —SO$_2$ or —CO—, $R^5$ and $R^6$ represent, independently of each other, hydrogen, methyl or a halogen, particularly hydrogen, methyl, chlorine or bromine, $R^1$ and $R^2$ represent, independently of each other, hydrogen, a halogen, preferably chlorine or bromine, a $C_1$–$C_8$-alkyl, preferably methyl or ethyl, a $C_5$–$C_6$-cycloalkyl, preferably cyclohexyl, a $C_6$–$C_{10}$-aryl, preferably phenyl, or a $C_7$–$C_{12}$-aralkyl, preferably a phenyl-$C_1$–$C_4$-alkyl, particularly benzyl, m is an integer from 4 to 7, preferably 4 or 5, n is 0 or 1, $R^3$ and $R^4$ are individually selectable for each X and represent, independently of each other, hydrogen or a $C_1$–$C_6$-alkyl, and X represents carbon, with carbonic acid halides, preferably phosgene, and/or with aromatic dicarboxylic acid dihalides, preferably benzene dicarboxylic acid dihalides, by the phase boundary process, or with phosgene by the homogeneous phase process (what is termed the pyridine process), wherein the molecular weight can be adjusted in the known manner by an appropriate amount of known chain terminators.

Examples of suitable diphenols of formulae (I) and (II) include hydroquinone, resorcinol, 4,4'-dihydroxydiphenyl, 2,2-bis-(4-hydroxyphenyl)-propane,2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1 -bis-(4-hydroxyphenyl)-3,3,5-trimethylcyclohexane, 1,1-bis-(4-hydroxyphenyl)-3,3-dimethylcyclohexane, 1,1-bis(4-hydroxyphenyl)-3,3,5,5-tetramethylcyclohexane or 1,1-bis-(4-hydroxyphenyl)-2,4,4,-trimethylcyclopentane.

The preferred diphenols of formula (I) are 2,2-bis-(4-hydroxyphenyl)-propane and 1,1-bis-(4-hydroxyphenyl)-cyclohexane; the preferred phenol of formula (II) is 1,1-bis-(4-hydroxyphenyl)-3,3,5-trimethylcyclohexane.

Mixtures of diphenols may also be used.

Examples of suitable chain terminators include phenol, p-tert.-butylphenol, long chain alkylphenols such as 4-(1,3-tetramethyl-butyl)phenol according to DE-OS 2 842 005, monoalkylphenols, dialkylphenols having a total of 8 to 20 C atoms in their alkyl substituents according to DE-OS 3 506 472, such as p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The requisite amount of chain terminators is generally 0.5 to 10 mole %, with respect to the sum of diphenols (I) and (II).

Suitable polycarbonates or polyester carbonates may be linear or branched; branched products are preferably obtained by the incorporation of 0.05 to 2.0 mole %, with respect to the sum of the diphenols used, of trifunctional compounds or compounds with a functionality greater than three, e.g. those containing three or more than three phenolic groups.

The polycarbonates or polyester carbonates which are suitable may contain aromatically bonded halogen, preferably bromine and/or chlorine; they are preferably halogen-free.

They have average molecular weights ($M_W$, weight average), determined by ultracentrifuging or by the measurement of scattered light for example, from 10,000 to 200,000, preferably from 20,000 to 80,000.

Suitable thermoplastic polyesters are preferably polyalkylene terephthalates, namely reaction products of aromatic dicarboxylic acids or reactive derivatives thereof (e.g. dimethyl esters or anhydrides) and aliphatic, cycloaliphatic or arylaliphatic diols, and mixtures of reaction products such as these.

Preferred polyalkylene terephthalates can be prepared by known methods from terephthalic acid (or reactive derivatives thereof) and aliphatic or cycloaliphatic diols containing 2 to 10 C atoms (Kunststoff-Handbuch [Plastics Handbook], Volume VIII, page 695 et seq., Carl Hanser Verlag, Munich 1973).

In the preferred polyalkylene terephthalates, 80 to 100 mole %, preferably 90 to 100 mole %, of the dicarboxylic acid radicals are terephthalic acid radicals, and 80 to 100 mole %, preferably 90 to 100 mole %, of the diol radicals are ethylene glycol and/or 1,4-butanediol radicals.

In addition to ethylene glycol or 1,4-butanediol radicals, the preferred polyalkylene terephthalates may contain 0 to 20 mole % of other aliphatic diols containing 3 to 12 C atoms or cycloaliphatic diols containing 6 to 12 C atoms, e.g. radicals of 1,3-propanediol, 2-ethyl-propanediol-1,3, neopentyl glycol, 1,5-pentanediol, 1,6-hexanediol, cyclohexanedi-methanol-1,4,3-methylpentanediol-1,3 and -1,6,2-ethylhexanediol-1,3,2,2-diethylpropanediol-1,3, hexanediol-2,5,1,4-di(β-hydroxyethoxy)-benzene, 2,2,-bis-4-hydroxycyclohexyl)-propane, 2,4-dihydroxy-1,1,3,3-tetramethylcyclobutane, 2,2-bis-(3-β- hydroxyethoxyphenyl)-propane and 2,2-bis-(4-hydroxypropoxyphenyl)-propane (DE-OS 2 407 647, 2 407 776, 2 715 932).

The polyalkylene terephthalates may be branched by the incorporation of relatively small amounts of trihydric or tetrahydric alcohols or of tri- or tetrabasic carboxylic acids, as described in DE-OS 1 900 270 and U.S. Pat. No. 3,692,744. Examples of preferred branching agents include trimesic acid, trimellitic acid, trimethylolethane and -propane and pentaerythritol. It is advisable to use not more than 1 mole % of the branching agent, with respect to the acid component.

Polyalkylene terephthalates are particularly preferred which have been prepared solely from terephthalic acid and reactive derivatives thereof (e.g. dialkyl esters thereof) and ethylene glycol and/or 1,4-butanediol. Mixtures of these polyalkylene terephthalates are also particularly preferred.

Preferred polyethylene terephthalates also comprise copolyesters which are prepared from at least two of the aforementioned alcohol components; particularly preferred copolyesters comprise poly-(ethylene glycol-1,4-butanediol) terephthalates.

In general, the preferred polyalkylene terephthalates which are suitable have an intrinsic viscosity of 0.4 to 1.5 dl/g, preferably 0.5 to 1.3 dl/g, particularly 0.6 to 1.2 dl/g, measured in each case in phenol/o-dichlorobenzene (1:1 parts by weight) at 25° C.

Suitable polyamides comprise known homopolyamides, copolyamides and mixtures of these polyamides. These may be partially crystalline and/or amorphous polyamides.

Polyamide-6, polyamide-6,6, and mixtures and corresponding copolymers of these components are suitable as partially crystalline polyamides. Suitable partially crystalline polyamides also comprise those of which the acid component completely or partially consists of terephthalic acid and/or isophthalic acid and/or suberic acid and/or sebacic acid and/or azelaic acid and/or adipic acid and/or cyclohexanedicarboxylic acid, the diamine component thereof completely or partially consists of m- and/or p-xylylene-diamine and/or hexamethylenediamine and/or 2,2,4-trimethylhexamethylenediamine and/or 2,2,4-trimethylhexamethylenediamine and/or isophoronediamine, and the composition of which is known in principle.

Polyamides are also suitable which are completely or partially produced from lactams having 7 to 12 C atoms in their ring, optionally with the use in conjunction of one or more of the aforementioned starting components.

Particularly preferred partially crystalline polyamides comprise polyamide-6 and polyamide-6,6 and their mixtures. Known products can be used as amorphous polyamides. They are obtained by the condensation polymerisation of diamines such as ethylenediamine, hexamethylenediamine, decamethylenediamine, 2,2,4- and/or 2,4,4-trimethylhexamethylene diamine, m- and/or p-xylylene-diamine, bis-(4-amino-cyclo-hexyl)-methane, bis-(4-aminocyclohexyl)-propane, 3,3'-dimethyl-4,4'-diamino-di-cyclohexylmethane, 3-aminomethyl,3,5,5,-trimethylcyclohexylamine, 2,5- and/or 2,6-bis-(aminomethyl)-norbornane and/or 1,4-diaminomethylcyclohexane with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Copolymers which are obtained by the condensation polymerisation of a plurality of monomers are also suitable, as are copolymers which are produced with the addition of aminocarboxylic acids such as ε-aminocaproic acid, ω-aminoundecanoic acid or ω-aminolauric acid or lactams thereof.

Polyamides which are particularly suitable are polyamides produced from isophthalic acid, hexamethylenediamine and other diamines such as 4,4'-diamino-dicyclohexylmethane, isophoronediamine, 2,2,4- and/or 2,4,4-trimethylhexamethylene diamine, 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and laurolactam; or from terephthalic acid and the mixture of isomers comprising 2,2,4- and/or 2,4,4-trimethylhexamethylene diamine.

Instead of pure 4,4'-diaminodicyclohexylmethane, mixtures of positional isomers of diaminodicyclohexylmethane can also be used which are composed of 70 to 99 mole % of the 4,4'-diamino isomer 1 to 30 mole % of the 2,4'-diamino isomer 0 to 2 mole % of the 2,2'-diamino isomer, and optionally of diamines which are correspondingly more highly condensed and which are obtained by the hydrogenation of industrial quality diaminodiphenylmethane. Up to 30% of the isophthalic acid may be replaced by terephthalic acid.

The polyamides preferably have a relative viscosity (measured as a 1% by weight solution in m-cresol at 25° C.) of 2.0 to 5.0, most preferably of 2.5 to 4.0.

Mixing of the individual components A, B and optionally C can be effected in various ways.

Graft rubber component A) is preferably isolated by known methods, for example by spray drying or by the addition of salts and/or acids, washing the precipitated products and drying the powder, and is thereafter mixed with graft rubber component B) and optionally with resin component C) (preferably in multiple cylinder mills, mixer-extruders or internal kneaders).

If resin component C) has been produced by emulsion polymerisation, this latex can be mixed with the latex of component A) and they can be worked up jointly.

The requisite or advisable additives may be added to the moulding compositions according to the invention during their production, work-up, further processing and final forming. Examples of such additives include antioxidants, UV stabilisers, peroxide destroyers, antistatic agents, lubricants, demoulding agents, flame retardants, fillers or reinforcing agents (glass fibres, carbon fibres, etc.), and colorants.

The final forming operation may be effected in commercially available processing units, and comprises injection moulding processing, sheet extrusion, optionally with subsequent hot forming, cold forming, extrusion of tubes and sections, and calendering.

In the following examples the parts quoted are always parts by weight and the percentages quoted are always percentages by weight, unless indicated otherwise.

EXAMPLES

Graft rubber polymer A with a jagged structure (according to the invention)

40 parts by weight (calculated as the solid) of an anionically emulsified polybutadiene latex produced by radical polymerisation, with a $d_{50}$ value of 284 nm and a swelling index of 59, were mixed with water to a solids content of about 20% by weight, followed by heating to 63° C. and the addition of 0.5 parts by weight of potassium peroxodisulphate (dissolved in water).

Thereafter, 60 parts by weight of a mixture comprising 72% by weight of styrene and 28% by weight of acrylonitrile and 0.1 parts by weight of tert.-dodecyl mercaptan was added over 4 hours so that the following contents of unreacted monomer resulted in the reaction mixture in the course of the polymerisation reaction (determined by taking a sample, addition of phenothiazine, coagulation of the polymer fraction and calculation of the unreacted amount of monomer).

| Time of sampling (minutes after the start of the reaction) | Content of unreacted monomer in the reaction mixture (with respect to the amount of monomer added in each case) |
|---|---|
| 20 | 8.4 |
| 40 | 14.2 |
| 60 | 19.2 |
| 80 | 20.1 |
| 100 | 18.3 |
| 120 | 16.1 |
| 140 | 13.6 |
| 160 | 11.0 |
| 180 | 7.4 |
| 200 | 2.1 |
| 220 | 1.1 |
| 240 | 2.0 |
| 260 | 0.8 |
| 280 | 0.7 |
| 300 | 0.5 |

In parallel with the monomers, 1 part by weight (calculated as the solid substance) of the sodium salt of a resin acid mixture (Dresinate 731, dissolved in water made alkaline) was added over 4 hours as an emulsifier. After a secondary reaction time of 1 hour, the graft rubber was coagulated with a mixture of aqueous magnesium sulphate solution and acetic acid after the addition of about 1.0 parts by weight of a phenolic antioxidant; after washing with water the resulting powder was dried under vacuum at 70° C.

Graft rubber polymer X without a jagged structure (comparison)

The reaction described under "graft rubber polymer A" was repeated, a polybutadiene latex with a $d_{50}$ value of 285 nm and a swelling index of 20 being used.

Graft rubber polymer Y without a jagged structure (comparison)

The reaction described under "graft rubber polymer A" was repeated, the monomers being added so that the following contents of unreacted monomer resulted in the reaction mixture in the course of the polymerisation reaction:

| Time of sampling (minutes after the start of the reaction) | Content of unreacted monomer in the reaction mixture (with respect to the amount of monomer added in each case) |
|---|---|
| 20 | 4.1 |
| 40 | 5.2 |
| 60 | 4.3 |
| 80 | 3.9 |
| 100 | 4.6 |
| 120 | 4.5 |
| 140 | 4.5 |
| 160 | 4.1 |
| 180 | 4.0 |
| 200 | 4.9 |
| 220 | 5.1 |
| 240 | 4.7 |
| 260 | 3.1 |
| 280 | 2.0 |
| 300 | 0.6 |

Graft rubber polymer B 1

Magnum 3105 FP bulk ABS from Dow, with a rubber content of about 7% by weight and an average particle size of the rubber phase of about 800 nm.

Graft rubber polymer B 2

Magnum 3504 FP bulk ABS from Dow, with a rubber content of about 10% by weight and an average particle size of the rubber phase of about 900 nm.

Moulding compositions

The graft rubber polymer components described above were mixed in the proportions given in Table 1 in an internal kneader with 2 parts by weight of pentaerythritol tetrastearate and after granulation were processed by injection moulding to form test bars and to form a flat sheet (for the assessment of the surface).

The following data were determined:

The notched bar impact strength at room temperature ($a_k^{RT}$) and at −40° C. ($a_k^{-40°\,C.}$) according to ISO 180/1 A (units: kJ/m²), the indentation hardness $H_c$ according to DIN 53 456 (units: N/mm²), the dimensional stability under the effect of heat (Vicat B) according to DIN 53 460 (units: °C.), the MVI flow behavior according to DIN 53 735 U (units: cm³/10 min), and the gloss properties according to DIN 67 530 at an angle of reflection of 60° (reflectometer value).

Figure 2:
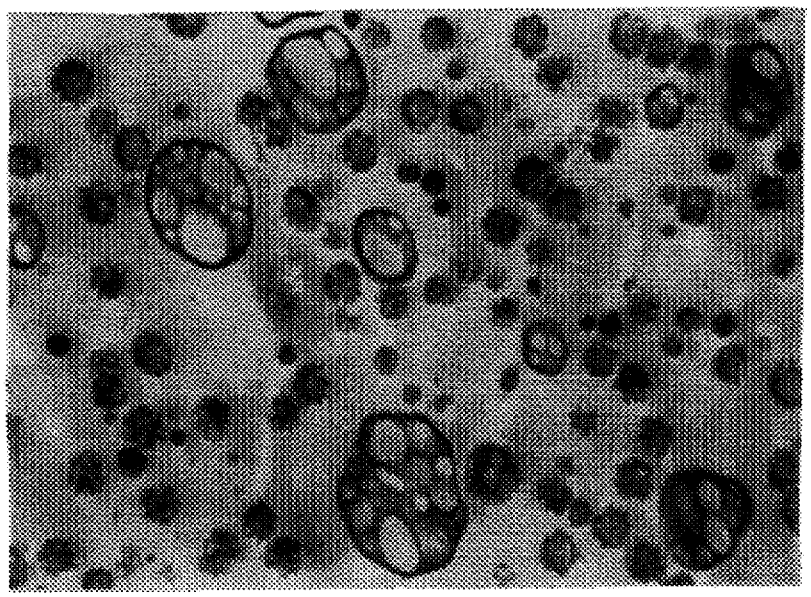
Figure 3:
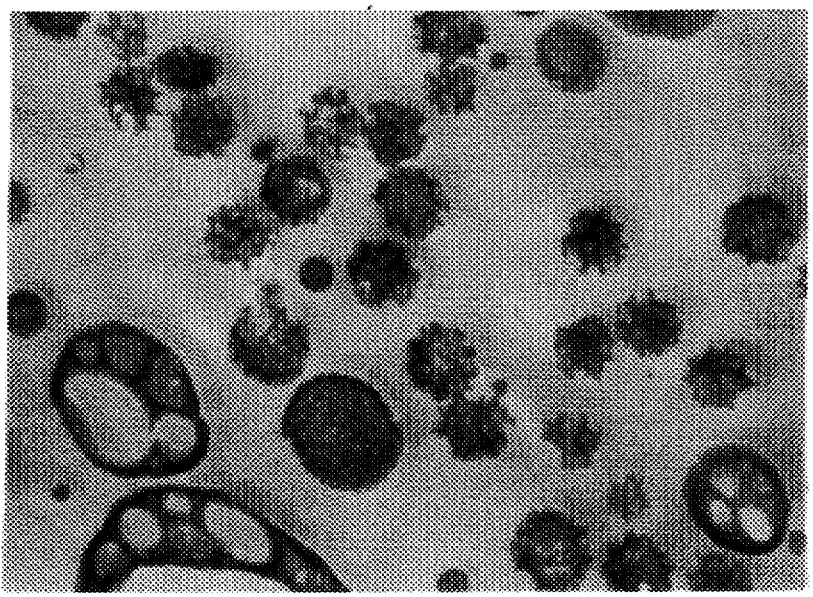

As an illustration, an electron microscope photograph was produced of a moulding composition according to the invention (Example 4) (contrasting with osmium tetroxide) (Magnification 10 000:1, 23 000:1 and 40 000:1, FIGS. 1 to 3).

It can be seen from the examples that the moulding compositions according to the invention possess drastically increased toughness values compared with the pure bulk ABS polymers, and that at the same time the other properties, particularly the low degree of gloss, are maintained.

TABLE 1

Compositions and test results of the moulding compositions investigated

| Example | Graft rubber A (parts by weight) | Graft rubber X (parts by weight) | Graft rubber Y (parts by weight) | Graft rubber B1 (parts by weight) | Graft rubber B2 (parts by weight) | $a_k^{RT}$ (kJ/m²) | $a_k^{-40°\,C.}$ (kJ/m²) | $H_c$ (N/mm²) | Vicat (°C.) | MVI (cm³/10 min) | Degree of gloss |
|---|---|---|---|---|---|---|---|---|---|---|---|
| 1 | 6.25 | — | — | 93.75 | — | 20 | 8 | 105 | 105 | 6.4 | 66 |
| 2 (comparison) | — | 6.25 | — | 93.75 | — | 16 | 7 | 104 | 105 | 5.6 | 67 |
| 3 (comparison) | — | — | 6.25 | 93.75 | — | 15 | 6 | 103 | 101 | 5.1 | 69 |
| 4 | 18.75 | — | — | 81.25 | — | 28 | 15 | 93 | 103 | 5.8 | 69 |

TABLE 1-continued

Compositions and test results of the moulding compositions investigated

| Example | Graft rubber A (parts by weight) | Graft rubber X (parts by weight) | Graft rubber Y (parts by weight) | Graft rubber B1 (parts by weight) | Graft rubber B2 (parts by weight) | $a_k^{RT}$ (kJ/m$^2$) | $a_k^{-40°\,C.}$ (kJ/m$^2$) | $H_c$ (N/mm$^2$) | Vicat (°C.) | MVI (cm$^3$/10 min) | Degree of gloss |
|---|---|---|---|---|---|---|---|---|---|---|---|
| 5 (comparison) | — | 18.75 | — | 81.25 | — | 23 | 10 | 91 | 104 | 5.0 | 70 |
| 6 (comparison) | — | — | 18.75 | 81.25 | — | 21 | 9 | 92 | 103 | 4.9 | 69 |
| 7 (comparison) | — | — | — | 100 | — | 13 | 5 | 118 | 105 | 6.2 | 67 |
| 8 | 7.5 | — | — | — | 92.5 | 32 | 11 | 84 | 101 | 6.3 | 63 |
| 9 (comparison) | — | 7.5 | — | — | 92.5 | 28 | 9 | 83 | 99 | 6.0 | 64 |
| 10 (comparison) | — | — | 7.5 | — | 92.5 | 27 | 9 | 80 | 98 | 5.5 | 66 |
| 11 (comparison) | — | — | — | — | 100 | 23 | 8 | 91 | 104 | 6.0 | 62 |

We claim:

1. Thermoplastic moulding compositions comprising

A) 1 to 60 parts by weight of at least one particulate graft rubber polymer which is produced by emulsion polymerisation, in which at least 50% of the graft rubber particles have a structure detectable via transmission electron microscopy photographs in which the individual particles contain irregular cellular inclusions of resin-forming polymer and the surface of the particles has an irregular jagged structure such that 5 to 30 of such peaks are present per depicted particle, which particles differ from an idealised round particle (having a diameter d) by a diameter d+d/x, where x=3 to 15, B) 40 to 99 parts by weight of at least one particulate graft rubber polymer which is produced by solution or bulk polymerisation, and optionally C) 0 to 200 parts by weight of at least one thermoplastic, rubber-free resin.

2. Thermoplastic moulding compositions according to claim 1, comprising

A) 2 to 50 parts by weight of at least one particulate graft rubber polymer which is produced by emulsion polymerisation, in which at least 60% of the graft rubber particles have a structure detectable via transmission electron microscopy photographs in which the individual particles contain irregular cellular inclusions of resin-forming polymer and the surface of the particles has an irregular jagged structure such that 7 to 25 of such peaks are present per depicted particle, which particles differ from an idealised round particle (having a diameter d) by a diameter d+d/x, where x=4 to 12, B) 50 to 98 parts by weight of at least one particulate graft rubber polymer which is produced by solution or bulk polymerisation, and optionally C) 0 to 100 parts by weight of at least one thermoplastic, rubber-free resin.

3. Thermoplastic moulding compositions according to claim 1, characterised in that the particulate graft rubber polymers consist of polybutadiene and a grafted-on copolymer of styrene and acrylonitrile.

4. Thermoplastic moulding compositions according to claim 1, characterised in that at least one resin selected from an α-methylstyrene/acrylonitrile copolymer, an aromatic polycarbonate, an aromatic polyester carbonate, a polyester or a polyamide is contained as the thermoplastic component C.

* * * * *